United States Patent [19]

Imai et al.

[11] Patent Number: 4,816,915
[45] Date of Patent: Mar. 28, 1989

[54] TWO-PICTURE TELEVISION RECEIVER

[75] Inventors: Kiyoshi Imai, Ibaraki; Kazumi Kawashima, Takatsuki, both of Japan

[73] Assignee: Matsushita Electric Industrial Co., Ltd., Kadoma, Japan

[21] Appl. No.: 34,394
[22] PCT Filed: Jul. 14, 1986
[86] PCT No.: PCT/JP86/00357
§ 371 Date: Mar. 12, 1987
§ 102(e) Date: Mar. 12, 1987
[87] PCT Pub. No.: WO87/00715
PCT Pub. Date: Jan. 29, 1987

[30] Foreign Application Priority Data

Jul. 19, 1985 [JP] Japan .................................. 60-160580

[51] Int. Cl.$^4$ ..................... H04N 5/268; H04N 5/272
[52] U.S. Cl. ..................................... 358/183; 358/181
[58] Field of Search ................. 358/183, 22, 181, 160

[56] References Cited

U.S. PATENT DOCUMENTS

| | | | |
|---|---|---|---|
| 3,652,790 | 3/1972 | Eberhardt | 358/183 |
| 4,172,264 | 10/1979 | Taylor | 358/183 |
| 4,249,213 | 2/1981 | Imaide | 358/183 |
| 4,665,433 | 5/1987 | Hinson | 358/183 |
| 4,665,438 | 5/1987 | Miron | 358/183 |
| 4,673,983 | 6/1987 | Sarugaki | 358/183 |
| 4,680,630 | 7/1987 | Field | 358/160 |

FOREIGN PATENT DOCUMENTS 2413839 9/1875 Fed. Rep. of Germany .
153484 11/1980 Japan .
10586 1/1982 Japan .

Primary Examiner—Tommy P. Chin
Attorney, Agent, or Firm—Cushman, Darby & Cushman

[57] ABSTRACT

In a two-picture television receiver, a field polarity detection circuit detects field polarity of an image signal of a main picture. A first and a second field memories are capable of writing-in an image signal to constitute a sub-picture for respective fields, and read-out circuit alternately reads-out from the first and the second field memories in response to a polarity detection signal of the field polarity detection circuit. A write-in field determining circuit determines into which of the first or the second field memories (2), (3), the image signal for the sub-picture is to be written. This writing is based on the polarity detection signal of the field polarity detection circuit, a vertical synchronization signal in image signal of sub-picture, and a binary signal which changes alternately for respective one field based on the vertical synchronization signal. With this receiver, even a non-interlace image signal can be written, respectively, in the first and the second field memories, and a good quality image of two-pictures can be obtained.

2 Claims, 4 Drawing Sheets

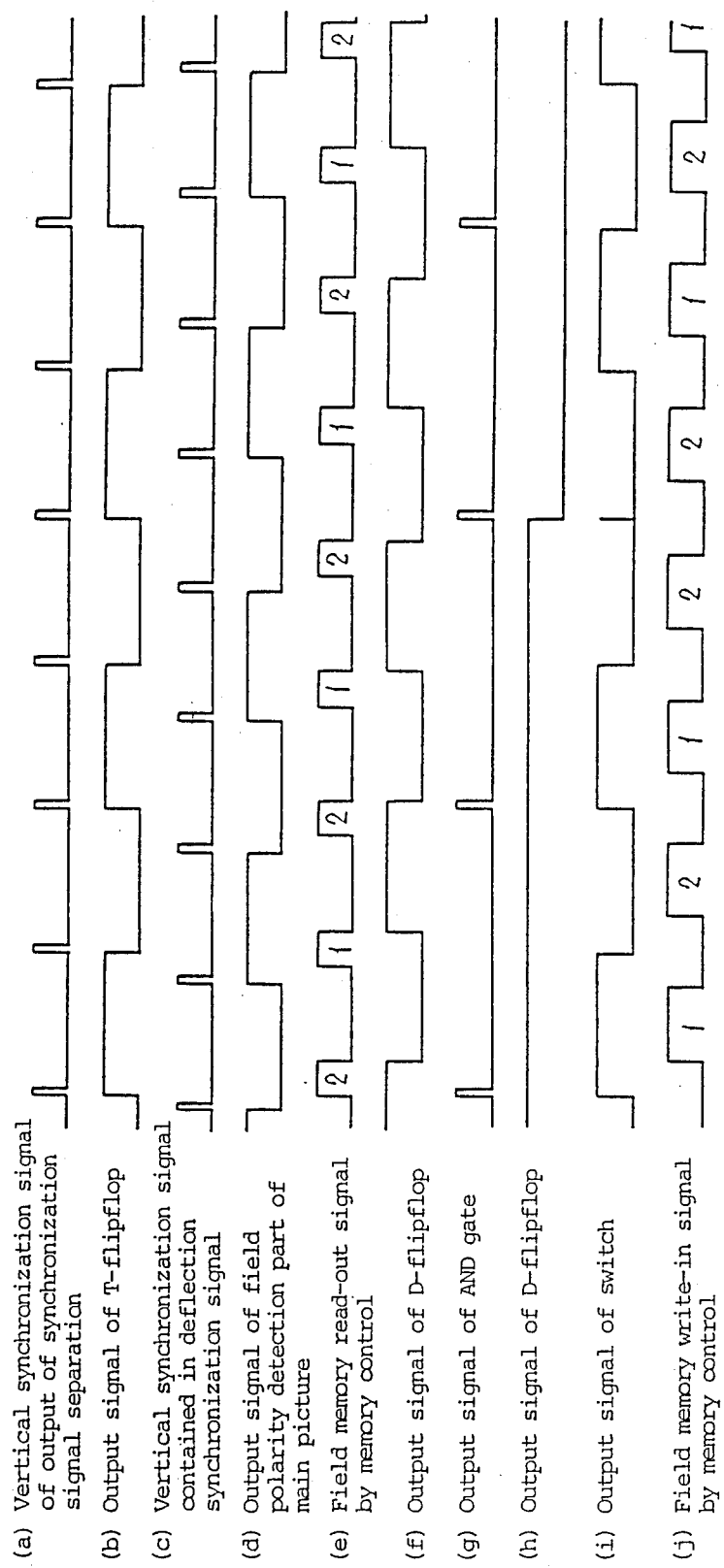

TWO-PICTURE TELEVISION RECEIVER

TECHNICAL FIELD

The present invention relates particularly to an interlace control circuit for two-picture television receiver which displays two different images on one display screen.

BACKGROUND ART

Hitherto, the two-picture television receiver has been realized in various circuit types. The interlace control circuit is one of the arts necessary for realizing it. That is, in television broad-cast images, one image consists of one frame which is a combination of a first field and a second field; and in order to display two different images (frequencies and phases of their synchronization signals are different each other) on the same picture, it is necessary to make an agreement in field relation between these two. It is the interlace controlling circuit which realizes this.

First, elucidation is made on the interlace controlling circuit of a conventional two-picture television receiver. FIG. 1 is a schematic view of the two-picture television receiver. In the figure, numeral 31 is a televisions receiver, numeral 32 is a main-picture, numeral 33 is a sub-picture which is compressed and synthesized in one part of the main-picture 32.

FIG. 2 is a block diagram of the conventional two-picture television receiver. In the figure, numeral 41 is a cathode-ray tube (hereafter is abbreviated as CRT), numeral 42 is an input terminal whereto an image signal for the main-picture is applied to, and numeral 43 is an input terminal whereto an image signal for the sub-picture is applied. For instance, in a television receiver having two tuners, an image signal made by detecting output signal of the one tuner is applied to the one input terminal 42, an image signal made by detecting and processing output signal of the other signal is applied to the other input terminal 43. And, in a television receiver having one tuner and an input terminal, whereto an image signal output from external apparatus, for instance, video tape recorder or video disc player and so on is impressed, the one image signal is that from the tuner and the other one is from the above-mentioned external apparatus.

Numeral 44 is a circuit part for processing the image signal of the main-picture, numeral 45 is a circuit part for processing image signal of the sub-picture, numeral 46 is an output line of the main-picture processing circuit part 44, numeral 47 is an output line of the sub-picture operation circuit part 45, numeral 48 is a two-input-one-output switch, and numeral 49 is an output line for a signal to deflect CRT 41.

Hereafter, operation of the above-mentioned constitution is elucidated. When the switch 48 is connected to the terminal A, the image signal for the main-picture is conveyed to the CRT 41. When the switch 48 is connected to the terminal B, the image signal for the sub-picture is conveyed to the CRT 41. That is, the switch 48 is connected to the terminal B only when the CRT 41 is scanning by the deflection signal at the part of the sub-picture 33 of FIG. 1. In the sub-picture processing circuit part 45, mainly the following two processings are carried out against the sub-picture image signal inputted from the input terminal 43.

(1) To synchronize with deflection signal of the CRT 41.

(2) To compress the image into the size of the sub-picture 33.

For this purpose, a memory becomes necessary for the sub-picture processing circuit 45. There is prior art, for instance, disclosed in the Gazette of Japanese unexamined published patent application No. Sho 54-156420, which realizes such function by a circuit including two field memory parts.

Hereafter, the above-mentioned conventional sub-picture processing circuit part 45 is explained with reference to FIG. 3. In the drawing, numeral 43 is the input terminal of the image signal for the sub-picture, numeral 47a is the output terminal of the image signal of the sub-picture processing part 45, and numeral 49a is an input terminal of the image signal of the main-picture. Numeral 51 is a field polarity detection part of the sub-picture, numeral 52 is a detection part of the main-picture field polarity, numerals 53 and 54 are memories having a capacity of storing image signals of one field of the sub-picture 33; and therein the numeral 53 is named A-field memory and the numeral 54 is named B-field memory. Numeral 55 is a circuit part for separating synchronization signal from the sub-picture image signal, numeral 56 is an interlace control circuit part, numerals 57 and 58 are switches and numeral 59 is a memory control part.

Next, operation of the sub-picture processing circuit part 45 of the conventional two-picture television receiver is elucidated hereafter. In the field polarity detection parts 51 and 52, field polarities are detected by detecting relations between horizontal synchronization signals and vertical synchronization signals of respective input signals. The output signal of the field polarity detection part 51 of the sub-picture controls the switch 57, and determines in which field memory the sub-picture image signal is to be written. Here, let us provide that the writing is made in the A-field memory 53 when the field of the sub-picture is the first field, and writing is made in the B-field memory 54 when the case is the second field. Readings of the field memories 53 and 54 are fundamentally preferable to be carried out from the A-field memory 53 when the main-picture is the first field, and from the B-field memory 54 when it is the second field.

However, in the two-picture constitution as of FIG. 1, the following problem takes place. That is, in order to compress the size in vertical direction of the sub-picture 33 to 1/N in comparison with the main-picture 32, memory reading-out speed in vertical direction corresponding to the memory writing-in speed must be made N times. That is, in case the switches 57 and 58 are connected to the same field memory, there may take place a case that a vertical direction writing-in is outrun by the vertical direction reading-out. In this case, prior to the outrunning, for instance, newer information of time is displayed in the upper half part of the sub-picture 33, and an older information is displayed on the picture in the lower half part which is the case of after the outrunning, and it make unnatural image in case of the fast moving images.

Therefore, in this conventional example, by means of the interlace control circuit 56, the switch 58 is controlled so that the reading is made from the field memory which does not make the above-mentioned outrunning. In this case, when the A field memory 53 which stores the first field of the sub-picture 33 is read-out in the second field of the main picture 32, the interlace relation becomes abnormal when it is left alone, and therefore a reading of the A-field direction is delayed through the memory control part 59 for one horizontal period.

Hereupon, image source to be inputted as the sub-picture becomes in many varieties recently, and among these, abnormal image signals which are out of the standard of television signal increases. Here, that which becomes a problem is a television signal of non-interlace television. This appears in a personal computer or image at skip play-back of a video tape recorder, and is an image signal having no field polarity. In such case, in the conventional example, the image signal is written in one of the field memories only, since field polarity detection output signal of the sub-picture is fixed. However, since the reading is made alternately from both field memories in the reading, the display becomes in such a state that, on a still-picture which is read-out from the one field memory, a moving-picture which is read-out of the other field memory is superposed, thereby making the image very much unpleasant.

DISCLOSURE OF THE INVENTION

The present invention purposes to provide a two-picture television receiver, wherein even a non-interlace image signal can be written fundamentally alternately in two field memories, and can be read-out from the above-mentioned two-field memories at normal timings.

The two-picture television signal of the present invention is characterized by comprising a field polarity detection circuit for detecting field polarity of an image signal of a main picture, a first field memory and a second field memory capable of writing-in an image signal to constitute a sub-picture for respective fields, read-out means for alternately reading-out from the first field memory and the second field memory responding to polarity detection signal of the field polarity detection circuit, and a write-in field determining circuit for determining into which of the first field memory or the second field memory the image signal for the sub-picture is to be written and which is based on respective signals of the polarity detection signal of the field polarity detection circuit, a reading signal of the field memories, a vertical synchronization signal in the image signal of the sub-picture, and a binary signal which changes alternately for respective one field basing on the vertical synchronization signal.

Thus, the operation at reading-out from the first and the second field memories is made simply by only reading the memories basing on the field polarity detection signal of main picture. On the other hand, in writing-in, fundamentally the writings are made for respective fields alternately in two sets of the field memories. But, the state of reading-out of the field memories are monitored so that the above-mentioned state of being outrun does not happen. According to this method, even when the non-interlace signal is supplied to the sub-picture, the writings-in are made in the two field memories, and there is no trouble.

BRIEF DESCRIPTION OF THE DRAWINGS

FIG. 5 is a signal wave form diagram for various parts for elucidation of operation circuit of FIG. 4.

BEST MODE FOR CARRYING OUT THE INVENTION

Figure 1:
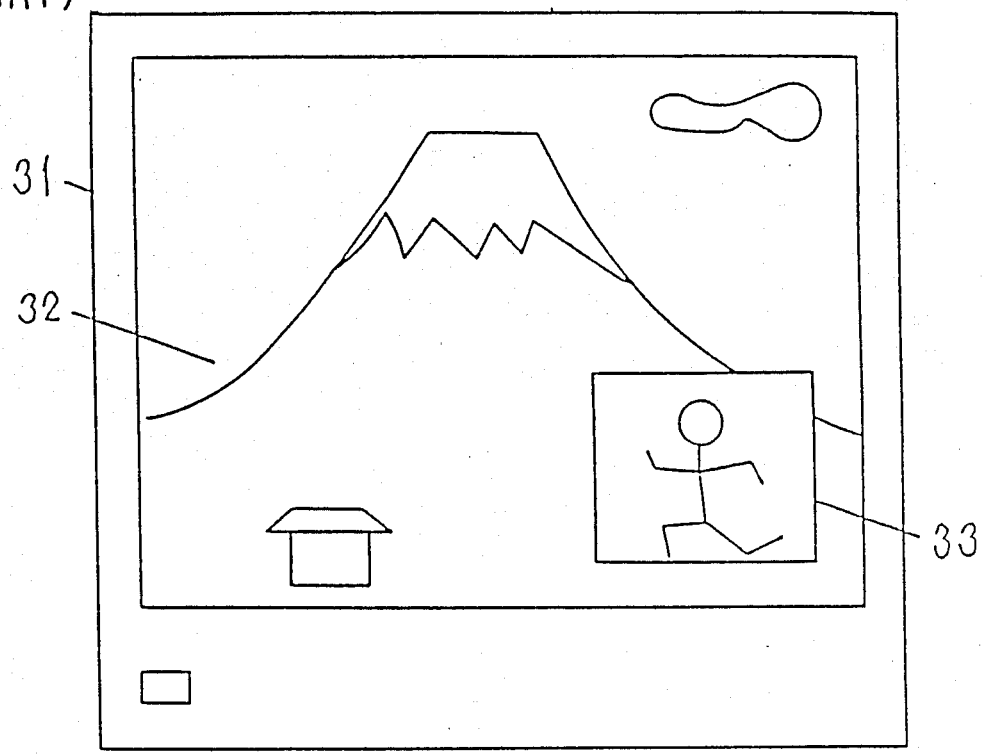
FIG. 1 is the schematic diagram of the two-picture television receiver.
Figure 2:
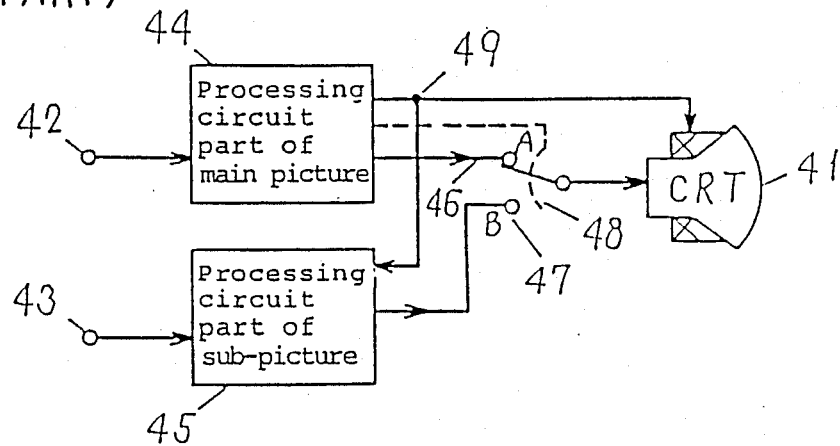
FIG. 2 is the over-all block diagram of the two-picture television receiver.

Hereafter, elucidation is made with reference to the drawing, concerning a two-picture television receiver of one embodiment of the present invention.

Figure 3:
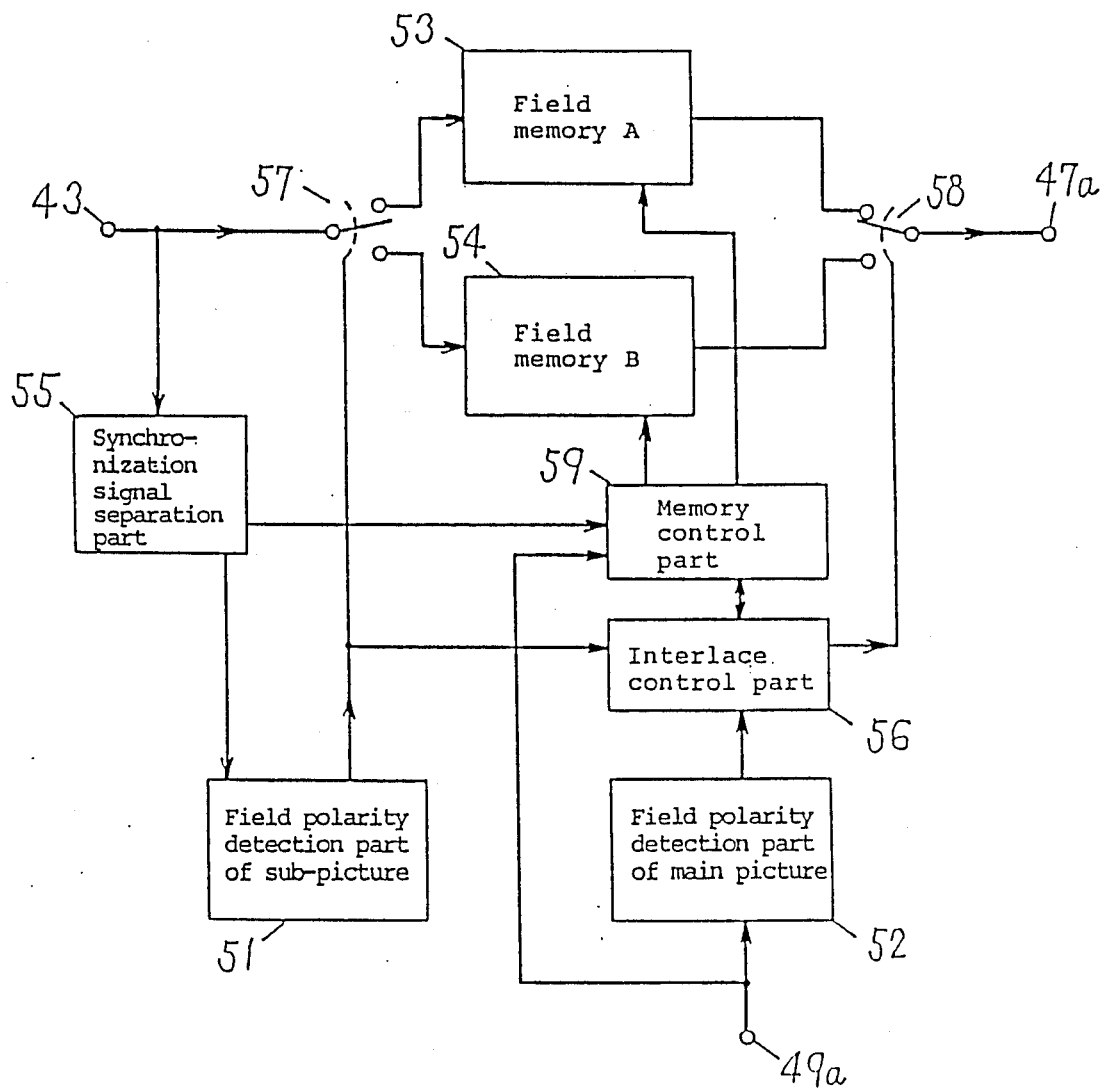
FIG. 3 is the block diagram of the sub-picture processing circuit part of the conventional two-picture television receiver.
Figure 4:
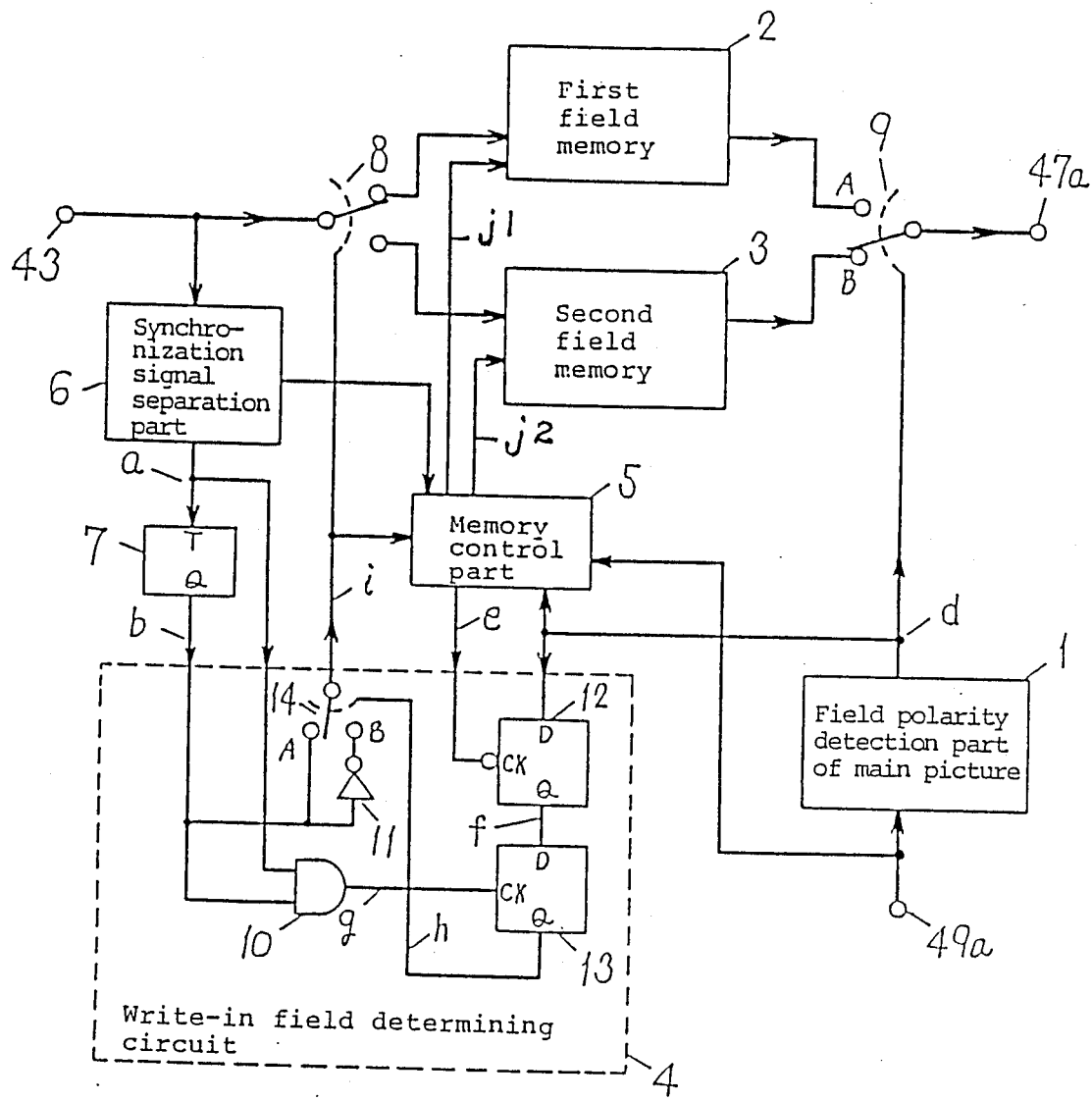
FIG. 4 is a block diagram of the sub-picture processing circuit part of a two-picture television receiver of one embodiment of the present invention.

FIG. 4 is a block diagram of a sub-picture processing circuit part of the two-part television receiver of the embodiment of the present invention. FIG. 4 corresponds to the sub-picture processing circuit part 45 of FIG. 3. In FIG. 4, numeral 43 is an input terminal of image signal for the sub-picture; numeral 47a is an output terminal of image signal to be output from the sub-picture processing circuit part 45; and numeral 49a is an input terminal of a deflection signal to deflect a CRT 41. Numeral 1 is a field polarity detection part of main picture; numerals 2 and 3 are a first field memory and a second field memory, respectively, which correspond to field polarities of the master picture to be read-out. Numeral 4 is a field determining circuit which determines in which field memories 2 or 3 the image signal of the sub-picture is to be written and contains therein an AND gate 10, an inverter 11, D-flipflops 12 and 13 and a switch 14. Numeral 5 is a memory control part; numeral 6 is a synchronization signal separation part for separating synchronization signal from the image signal of the sub-picture; numeral 7 is a T-flipflop whose output binary signal is alternately switched by vertical synchronization signal issued from the vertical synchronization signal separation part 6; numeral 8 is a switch inserted between the input terminal 43 and the first and the second field memories 2 and 3; numeral 9 is a switch inserted betweens the first and the second field memories 2 and 3 and the output terminal 47a.

In the write-in field determining circuit 4, to the AND gate 10, output signal from the synchronization signal separating part 6 and output signal of the T-flipflop 7 are applied as input. And output signal as it is of the T-flipflop 7 is given to one terminal A of the switch 14, and to the other terminal B of the switch 14 a signal inverted by the inverter 11 is applied. D-flipflop 12 takes read-out signal e from the memory control part 5 as its clock signal, and takes field polarity detection signal as its input. D-flipflop 13 takes output signal of the AND gate 10 as its clock signal, and takes Q output signal of the D-flipflop 12 as its input. By the Q output signal of the D-flipflop 13, the switch 14 is changed over.

FIG. 5 is a signal waveform chart of various parts of FIG. 4. Mark a is an output signal of the synchronization signal separation part 6, and is a vertical synchronization signal separated from the image signal for the sub-picture. Mark b is a binary signal which changes alternately to high level and to low level at rises of the vertical synchronization signal a. Mark c is a vertical synchronization signal of main picture which is contained in deflection synchronization signal to be applied to the terminal 49a. Mark d is an output signal of field polarity detection part 1 of the main picture, and controls the switch 9 so as to be connected to the terminal A of the side of the first field memory 2 when the level is high and connected to the terminal B of the side of the second field memory 3 when the level is low.

Mark e is an output signal of the memory control part 5 and issues a signal showing the high level when the first field memory 2 or the second field memory 3 is in reading-out state. Numerals 1 and 2 of this signal e show which field memory is now read-out, and shows that when the field polarity detection signal d of the main picture is at high level the first memory 2 is read-out, and when it is at the low level the second field memory 3 is read-out.

Mark f is a signal for latching the field polarity detection signal d by fall of the signal e. Mark g is a product of the vertical synchronization signal a of the sub-picture and the binary signal b. Mark h is an output signal for latching the signal f by rise of the output signal g of the AND gate. Mark i is an output signal of the switch 14 and when the signal h is at high level the output binary signal b of the T-flipflop 7 is output as i, and when the signal h is at low level a signal inversed of polarity of the binary signal b is issued as the signal i.

Mark j is a signal for writing-in the field memory by memory control part 5, and writing-in is made during its high level. Incidentally, numerals 1 and 2 attached to j show which field memory the writing-in is made, and shows that the writing-in is made in the first field memory 2 when the signal i is at high level, and the writing is made in the second field memory 3 when the signal i is at low level.

Hereafter, with regard to the embodiment of the above-mentioned constitution, its operation is elucidated with reference to FIG. 4 and FIG. 5. First, in the reading-outs of the image signal of the sub-picture from the field memories 2 and 3, as can be understood from that the switch 9 is directly controlled by the field polarity detection part 1 of the main picture, the controlling is made such that readings are simply made from the field memories 2 or 3 which corresponds to the field polarities of the main picture. This is the signal e.

Contrary to the above, which field memory 2 or 3 the image signal of the sub-picture is to be written-in is fundamentally determined by the binary signal b which is alternately changed over by the vertical synchronization signal a of the sub-picture. The binary signal b and its inversed signal are input to the switch 14, and output signal i therefrom directly controls the switch 8 which selects which field memory the image signal of the sub-picture is to be written. Output signal of the D-flipflop 13 being a signal of sufficiently slow changing in comparison with changing period of the binary signal b as mentioned below, even when the switch 14 is connected to either terminal A or B, the switch 8 is changed over at the period of vertical synchronization signal of the sub-picture responding to the binary signal b. That is, the image signal of the sub-picture is written-in, being supplied to the first field memory 2 and the second field memory 3 alternately at the period of the vertical synchronization signal of the sub-picture. Accordingly, there occurs no problem that the writing-in is made only to one field memory even when an image signal of non-interlace is input as the sub-picture.

However, as has been described with respect to the conventional example, a measure against "the state of outrun" is still necessary. In FIG. 4, D-flipflops 12 and 13, the AND gate 10 and the switch 14 make such function. In this example, the fundamental processing method is that the signal of the next field is written in the field memory which finishes its reading-out for a field.

Output signal f of the D-flipflop 12 is the one that output signal d of the field polarity detection part 1 of the main picture field is latched by fall of the read-out signal e. That is, latching is made at the point of time of finishing the reading-out of the field memory and the field polarity of the one in which reading is finished is shown. Then, at a starting of the writing-in the field memory, the output signal f which shows the field polarity is latched by the D-flipflop 13 by using an output signal g of the AND gate 10 which shows 1 frame period. When the output signal h of the D-flipflop 13 is at the high level, the switch 14 is connected to the terminal A to which the binary signal b is applied, and when it is at low level it is connected to the terminal B to which the inverse signal of the binary signal is applied. That is, the write-in field determining circuit 4 is the circuit which determines from which field memory the writing is to be made in sequence with a unit of frame terminal which is determined by the output signal g of the AND gate 10. When the output signal h is at high level, finishing of reading-out of the first field memory 2 being assured, in that frame period the writing in the first field memory 2 is made first, and subsequently the writing-in transfers to the second field memory 3. On the other hand, when the output signal h is at low level, the writing-in is made in the opposite order. When the signals e and j are compared, in the latter half of the writing-in period which is immediately before switching over of the signal h from the high level to the low level, the reading-out is started of the second field memory 3 which is the same one as that already being written, and this is a dangerous state.

If the next writing-in were selected provisionally for the memory 2 for the first field, in the side of reading-out, horizontal lines of the beginning part would become the older data, and the horizontal lines of the last part would become the newer data, and it gets into the so-called outrunning state. In the present circuit, by output signal h of the D-flipflop 13, the outrunning state can be evaded.

Incidentally, when the output signal h changes, writing-in into the same field memory is made continuously. However, the change of the output signal h being that which takes place induced by difference of vertical synchronization periods of the sub-picture and the main picture, the changing period is sufficiently longer compared with the vertical synchronization period and disturbance of the image is only for one field period, and there is no problem for actual use.

While the invention has been described in connection with what is presently considered to be the most practical and preferred embodiments, it is to be understood that the invention is not limited to the disclosed embodiment but, on the contrary is intended to cover various modification and equivalent arrangements included within the spirit and scope of the appended claims.

We claim:
1. A two-picture television receiver comprising:
   field polarity detection circuit means for detecting field polarity of an image signal of a main picture;
   first and second field memory means for storing sub-picture image signals of first and second fields, respectively, to constitute a sub-picture;
   memory control means for controlling write-in and read-out operations of said first and second field memory means;

write-in means for selectively writing-in said sub-picture image signal to said first and second field memory means;

read-out means for selectively reading-out said sub-picture image signal from said first and second field memory means, in response to a polarity detection signal of said field polarity detection circuit means;

synchronization signal separation means for separating a vertical synchronization signal from said sub-picture image signal;

binary signal generation means for generating a binary signal, in response to said vertical synchronization signal, having an alternating polarity in each vertical period; and write-in field determining circuit means for generating a control signal to said write-in means and said memory control means that represents which of said first field memory or said second field memory is to be written, in response to said polarity detection signal, said vertical synchronization signal, and said binary signal.

2. A two-picture television receiver in accordance with claim 1, wherein said write-in field determining circuit means comprises:

first D-flipflop means for latching said field polarity detection signal of said main picture in response to said detection signal when finishing a reading-out of one field memory;

second D-flipflop means for latching an output signal of said first D-flipflop means by using a frame synchronization pulse of said sub-picture image signal as a trigger; and two-input-one-output switch circuit means for selecting one of said binary signal and an inverted polarity of said binary signal to output as said control signal in response to polarities of an output signal of said second D-flipflop means.

* * * * *